US012618394B2

(12) United States Patent
Soerensen

(10) Patent No.: US 12,618,394 B2
(45) Date of Patent: May 5, 2026

(54) MONITORING AND CONTROL IN A WIND PARK

(71) Applicant: Siemens Gamesa Renewable Energy A/S, Brande (DK)

(72) Inventor: Johnny Soerensen, Videbaek (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 174 days.

(21) Appl. No.: 18/712,086

(22) PCT Filed: Nov. 9, 2022

(86) PCT No.: PCT/EP2022/081251
§ 371 (c)(1),
(2) Date: May 21, 2024

(87) PCT Pub. No.: WO2023/094154
PCT Pub. Date: Jun. 1, 2023

(65) Prior Publication Data
US 2025/0020107 A1      Jan. 16, 2025

(30) Foreign Application Priority Data
Nov. 24, 2021    (EP) ..................................... 21210133

(51) Int. Cl.
F03D 17/00        (2016.01)
(52) U.S. Cl.
CPC ...... F03D 17/021 (2023.08); *F05B 2270/303* (2013.01); *F05B 2270/332* (2013.01)
(58) Field of Classification Search
CPC .... F03D 17/021; F03D 17/018; F03D 17/027; F03D 7/028; F03D 9/257;
(Continued)

(56) References Cited

U.S. PATENT DOCUMENTS 9,606,518 B2 * 3/2017 Evans ..................... F03D 7/048
2004/0061380 A1 * 4/2004 Hann ..................... H02J 1/102
307/43
(Continued)

FOREIGN PATENT DOCUMENTS

EP        2573587 A2      3/2013
EP        2680390 A2      1/2014

OTHER PUBLICATIONS

PCT International Search Report and Written Option of International Searching Authority mailed Feb. 8, 2023 corresponding to PCT International Application No. PCT/EP2022/081251 filed Nov. 9, 2022.

*Primary Examiner* — Alvaro E Fortich
(74) *Attorney, Agent, or Firm* — Schmeiser, Olsen & Watts, LLP

(57)        ABSTRACT

A method of controlling electrical power transported on one or more power cables of a wind park is provided. Each of the one or more power cables is configured to transport electrical power generated by one or more wind turbines comprised in the wind park. The method includes for at least one power cable of the one or more power cables monitoring one or more stress parameters indicative of stress acting on the power cable to generate a monitored stress parameter, determining, based on at least the monitored stress parameter, whether a reduction of the stress on the power cable is required, and, when the reduction is required, reducing the electrical power transported on the power cable to reduce the stress acting on the power cable.

16 Claims, 3 Drawing Sheets

(58) Field of Classification Search
CPC .......... F05B 2270/303; F05B 2270/332; F05B 2270/3032; H02J 3/001; H02J 13/00002; H02J 2300/28; G01R 31/085; Y02E 10/72
See application file for complete search history.

(56) References Cited

U.S. PATENT DOCUMENTS

| | | | |
|---|---|---|---|
| 2012/0175877 A1* | 7/2012 | Ives | F03B 13/264 |
| | | | 290/42 |
| 2012/0271593 A1* | 10/2012 | Uluyol | F03D 7/048 |
| | | | 702/182 |
| 2014/0035284 A1* | 2/2014 | Bech | F03D 9/255 |
| | | | 290/44 |
| 2017/0002796 A1 | 1/2017 | Spruce et al. | |
| 2020/0083636 A1* | 3/2020 | Zugelder | H01R 13/631 |
| 2020/0132049 A1 | 4/2020 | Feltes et al. | |
| 2020/0340449 A1* | 10/2020 | Bjørn | H02J 3/381 |

* cited by examiner

Figure 3:
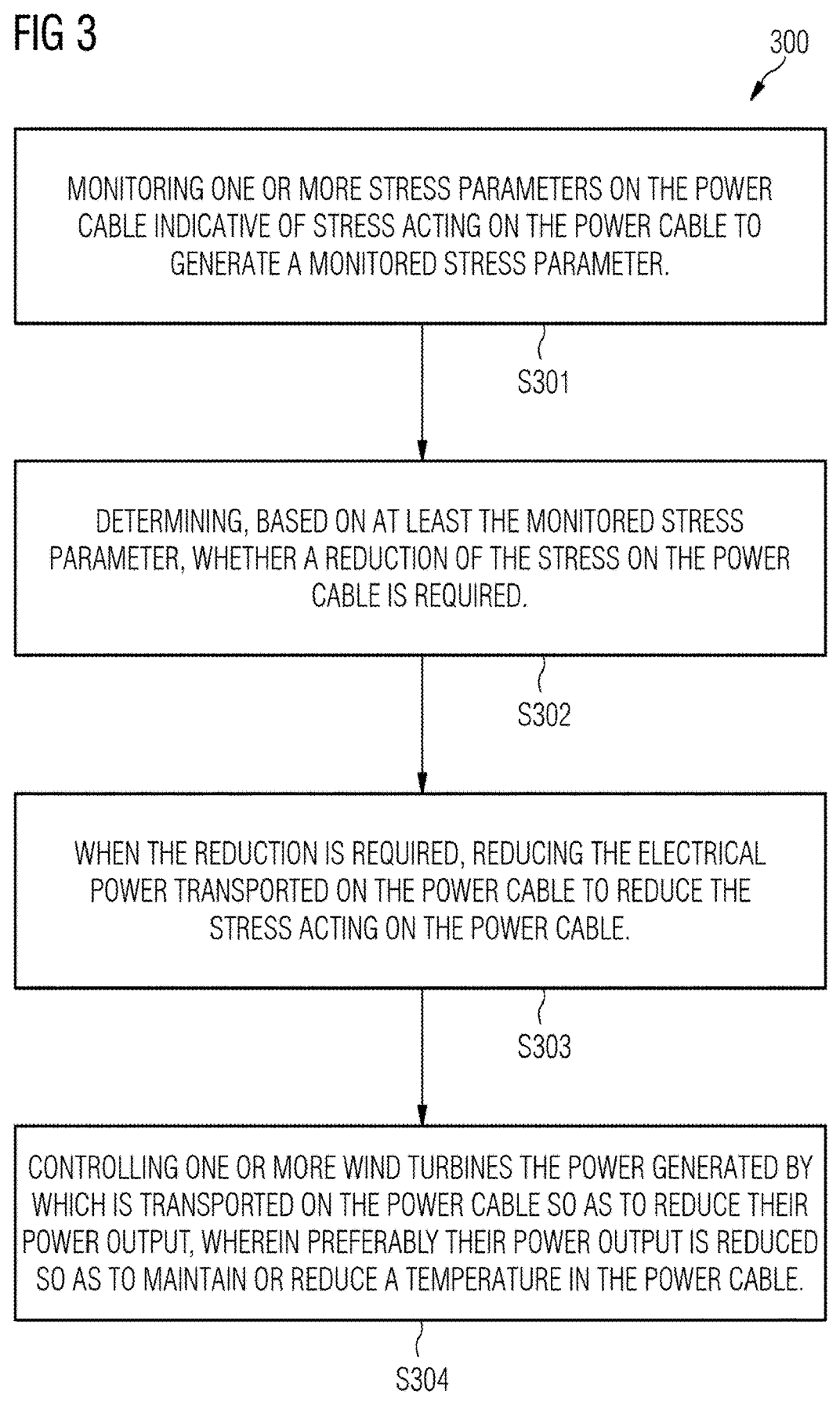

MONITORING ONE OR MORE STRESS PARAMETERS ON THE POWER CABLE INDICATIVE OF STRESS ACTING ON THE POWER CABLE TO GENERATE A MONITORED STRESS PARAMETER.

S301

DETERMINING, BASED ON AT LEAST THE MONITORED STRESS PARAMETER, WHETHER A REDUCTION OF THE STRESS ON THE POWER CABLE IS REQUIRED.

S302

WHEN THE REDUCTION IS REQUIRED, REDUCING THE ELECTRICAL POWER TRANSPORTED ON THE POWER CABLE TO REDUCE THE STRESS ACTING ON THE POWER CABLE.

S303

CONTROLLING ONE OR MORE WIND TURBINES THE POWER GENERATED BY WHICH IS TRANSPORTED ON THE POWER CABLE SO AS TO REDUCE THEIR POWER OUTPUT, WHEREIN PREFERABLY THEIR POWER OUTPUT IS REDUCED SO AS TO MAINTAIN OR REDUCE A TEMPERATURE IN THE POWER CABLE.

S304

MONITORING AND CONTROL IN A WIND PARK

CROSS-REFERENCE TO RELATED APPLICATIONS

This application is a national stage of PCT Application No. PCT/EP2022/081251, having a filing date of Nov. 9, 2022, claiming priority to EP application Ser. No. 21/210, 133.1, having a filing date of Nov. 24, 2021, the entire contents both of which are hereby incorporated by reference.

FIELD OF TECHNOLOGY

The following relates to a method of controlling electrical power transported on one or more power cables of a wind park. It further relates to a computer program for performing such method and a control system configured to carry out such method. It further relates to a wind park comprising such control system.

BACKGROUND

For the last decades, the number of wind parks, in particular offshore wind parks, has steadily risen. The wind parks require regular observation and maintenance effort. In case of offshore wind parks, the observation and maintenance effort comprises regular cable surveys to check the condition of the power cables associated with the wind park. Maintenance operations are performed, e.g., repairs, when required by the result of the cable surveys. Still, the power cables of a wind park today often fail after only a few years of operation. The failure may for example be due to erosion or overheating. In some cases, up to 30% of all cables of a wind park have to be exchanged during the lifetime of the wind park. The exchange of a failed cable however requires high manufacturing and implementation efforts. The monetary effort associated therewith may be quantified in millions of euros. Further, the wind turbines of the wind park that are coupled to a failed cable are disconnected from the grid and, thus, cannot feed the power they generate into the grid. In order to counteract the high risk of cable failure, the power cables of a wind park are today often over dimensioned. Over-dimensioning the power cables however results necessarily in higher manufacturing and resource costs as well as implementation effort.

The document US 2020/132049 A1 relates to a wind energy system including plural wind turbines connected to at least one cable network on which the electrical power of the wind turbines is transmitted. At least one control apparatus of the system controls the power that is fed into the cable network by at least one of the wind turbines by providing at least one power set point. The control apparatus includes at least one control device that determines the power set point based on a detected temperature of the cable network and a detected condition of the wind energy system.

SUMMARY

Accordingly, there is the need to mitigate at least some of the drawbacks mentioned above and to reduce the number of failures of power cables in a wind park.

This need is met by the features of the independent claims. The dependent claims describe embodiments of the invention.

An aspect relates to a method of controlling electrical power transported on one or more power cables of a wind park. Each of the one or more power cables is configured to transport electrical power generated by one or more wind turbines comprised in the wind park. In embodiments, the method comprises for at least one power cable of the one or more power cables monitoring one or more stress parameters indicative of stress acting on the power cable to generate a monitored stress parameter, determining, based on at least the monitored stress parameter, whether a reduction of the stress on the power cable is required, and, when the reduction is required, reducing the electrical power transported on the power cable to reduce the stress acting on the power cable.

In an embodiment, the method may comprise determining whether a (total) failure of the power cable is expected, wherein the determining is based on at least the monitored stress parameter.

Determining whether a failure is expected may include predicting or estimating the occurrence of a failure using the monitored stress parameter, e.g., by making use of a model. The determining whether the reduction of the stress on the power cable is required may be in particular a determining whether the reduction of the stress on the power cable is required in order to avoid the expected failure of the power cable.

Such method may allow detecting a potential risk of a cable failure due to stress acting on the cable prior to its total failure and, further, reacting on-time in response to the detection. In response, the stress acting on the power cable is reduced and prolonged stress on a cable is avoided. For example, reducing the electrical power reduces the thermal heating of the power cable on which further stress acts and, accordingly, the risk of an overheating of the cable is reduced. This way, it is timely reacted to an expected cable failure and precautionary measures are applied before the failure occurs and, hence, the expected failure is avoided/ prevented. Hence, total cable failures are avoided and the number of total cable failures in a wind park is reduced. Further, the life time of the cables may be extended. Furthermore, the wind turbines are not disconnected from the grid and continue to feed power thereto. Thus, the averaged uptime of the single wind turbines and the averaged power output of the wind park they are comprised in may be increased. Additionally, an on-time detection of failure-prone power cables allows applying efficient and predictive, i.e., on-time, maintenance.

Monitoring may for example be performed—but is not limited to—based on at least one of a sensor, a sensoring system, a model being implemented in software, and a filter based monitoring system, which may for example be a state observer, Kalman filter or the like. Monitoring may further comprise signal pre- and post-processing, e.g., filtering. Further, monitoring may utilize information obtained from hardware, e.g., sensors, which is implemented for the purpose of monitoring and/or may utilize information obtained from other hardware that is implemented for another purpose. Monitoring may further comprise estimations and predictions based on the obtained information.

Monitoring may be performed centrally by a monitoring unit comprised in the wind park or decentrally by a plurality of monitoring units each of which is associated with one of a plurality of wind turbines comprised in the wind park.

Stress may be an influencing factor that correlates with the condition of a power cable, i.e., which correlates with the health status of a power cable. More specifically, stress may have a negative influence on the condition of the power cable/may burden the power cable. The stress may in particular lead to a failure of the power cable. An example may be a thermal stress, e.g., due to a high temperature. Another example may be a mechanical stress, e.g., due to a bending of the power cable or due to a mechanical load acting on the power cable.

The monitored stress parameter may comprise one or more stress parameters and may hence be implemented so as to represent multiple stress parameters. The multiple stress parameters may be of different type.

It should be clear that each of the method steps described herein may be performed decentrally by each of the one or more wind turbines on wind turbine level or centrally on a higher hierarchical level, e.g., by a wind park server on the wind park level.

The wind park may in a non-limiting way be an offshore wind park.

In an embodiment, the method may comprise controlling one or more components of the wind park such that the electrical power transported on the power cable is reduced. Examples for such components may be the wind turbines comprised in the wind park, the wind turbines being for example controlled such to reduce their generated power output on the power cable. Another example for the components is switches, the switches being for example controllable to reroute a power flow in the wind park such that the transported power on the power cable is reduced.

In an embodiment, the step of reducing may comprise rerouting or redirecting the electrical power such that the electrical power at least partly bypasses the at least one power cable.

It should be clear that the rerouting or redirecting is performed before the at least one power cable fails.

In an embodiment, the step of reducing the electrical power transported on the power cable to reduce the stress acting on the power cable is performed only when the reduction is required.

According to an embodiment, the power cable is an export cable, an inter-array cable or an infield cable.

The inter-array cable may interconnect a plurality of wind turbines or individual wind turbines comprised the wind park. The interconnected wind turbines may be interconnected so as to be arranged in a structure, e.g., a ring structure, a parallel structure and/or a series structure or a combination thereof. A series structure may comprise a number of 5 to 10 wind turbines. However, it should be clear that a therefrom deviating number of wind turbines is also possible. Other types of arrangements of wind turbines in a structure may also be possible. The inter-array cable may transport the electrical power generated from one or more wind turbines. The electrical power may be transported towards an offshore substation.

The infield cable may interconnect wind turbines close to the offshore substation.

The export cable may transport the electrical power generated by one or more wind turbines of the wind park from an offshore region to an onshore region. The export cable may transport the electrical power transported from one or more wind turbines and/or one or more inter-array cables. The export cable may transport the electrical power from the offshore substation to an onshore substation.

According to an embodiment, the one or more stress parameter may comprise at least one parameter that is indicative of a thermal stress on the power cable and/or at least one parameter that is indicative of a mechanical stress on the power cable.

The thermal stress may be due to a high temperature of the power cable. The high temperature may for example be a result of the electrical power generated by the wind turbines and transported along the power cable during a longer period of lasting strong winds. Losses in the transport of the electrical power along the power cable may heat up the power cable. The mechanical stress on a power cable may be the result of a power cable that is exposed, i.e., that the cable is detached from its attachment or its fixture or its mounting. Accordingly, a motion and/or bending of the power cable may occur, the result of which is mechanical stress acting on the power cable. Further, mechanical forces (e.g., friction forces) may act on the power cable as a result of seabed movements, erosion or even seismic activity. The mechanical stress may act supportive for the thermal stress such that the power cable may heat up faster or such that hotspots occur at specific sections of the power cable. Accordingly, mechanical stress may increase the risk of failure due to thermal stress, i.e., overheating.

According to an embodiment, the one or more stress parameters comprise a parameter being indicative of at least one of a bending radius of the power cable, a motion of the power cable and a temperature of the power cable.

Monitoring the temperature for example allows an on-time detection of occurred or occurring thermal hotspots that may result in a cable failure. Further, the monitoring of the bending radius of the power cable and/or the monitoring of the motion of the power cable allows detecting that a power cable is exposed, i.e., is detached, and may be stressed mechanically.

In an embodiment, the power cable comprises at least a first section having a first diameter and a second section having a second diameter. The second diameter is greater than the first diameter. Further, determining whether a reduction of the stress on the power cable is required is performed for the first section at a first frequency and for the second section at a second frequency, and the first frequency is greater than the second frequency.

In an embodiment, the power cable comprises at least a first section on which the power output by a first plurality of wind turbines is transported and a second section on which the power output by a second plurality of wind turbines is transported. The first plurality is greater than the second plurality. Further, determining whether a reduction of the stress on the power cable is required is performed for the first section at a first frequency and for the second section at a second frequency, and the first frequency is greater than the second frequency.

Such diameter dependence in the determining step allows a more intense monitoring of such sections of the power cable which may potentially withstand higher stresses.

According to an embodiment, reducing the electrical power transported on the power cable comprises controlling one or more wind turbines the power generated by which is transported on the power cable so as to reduce their power output. In an embodiment, their power output may be reduced so as to maintain or reduce a temperature in the power cable.

The other wind turbines of the wind park may remain unchanged and continue their operation. The curtailed (power reduced) wind turbines may return to full operation as soon as possible.

Reducing the power on the failure-prone power cable maintains or reduces the temperature in the power cable. Thus, the wind turbines may be controlled such to avoid a failure of the power cable. If mechanical stress acting on the power cable is detected, maintenance may be applied during the period of reduced power production in order to address the problem responsible for the mechanical stress, e.g., an exposed cable may be reattached (for example by burying it again in rubble material on the seabed) and/or an injured cable may be repaired.

In an embodiment, the electrical power transported on the power cable is reduced and the method further comprises determining whether the stress acting on the power cable is reduced, and when the stress is reduced, reversing the reducing of the electrical power transported on the power cable. In another embodiment, the reversing is performed in response to other conditions or after a predetermined period of time.

Doing so, it is ensured that the stress and, accordingly, the power output of the wind park is reduced only for the required period of time.

According to an embodiment, the controlling of the one or more wind turbines comprises curtailing an electrical power output of at least one wind turbine of the one or more wind turbines the power generated by which is transported on the power cable. In an embodiment, the at least one wind turbine may be selected so as to minimally reduce an overall power production of the wind park or such that when at least one further wind turbine comprised by the one or more wind turbines is selected the overall power production is less than when the at least one wind turbine is selected.

It may not always be required to curtail all wind turbines being coupled to a power cable in order to reduce the electrical power transported on a specific section of the power cable. A selection of only the relevant wind turbines allows then that the power cable failure may be avoided and that the power production losses of the wind park due to the curtailment is reduced.

In an embodiment, the one or more wind turbines are coupled in a series comprising a first wind turbine and a second wind turbine, and the power cable comprises a first section and second section, the first section starting from a first coupling point that is associated with the first wind turbine, the second section starting from a second coupling point that is associated with the second wind turbine. The first section transports the electrical power generated by the first wind turbine and the second section transports the electrical power generated by both the first wind turbine and the second wind turbine. In embodiments, the method comprises determining that a reduction of the stress on the power cable is only required in the first section and the first wind turbine is controlled so as to reduce the electrical power transported on the power cable. In an embodiment, the controlling of the first wind turbine may comprise curtailing an electrical power output of the first wind turbine.

Doing so the second turbine may continue to operate on full power and, hence, the power production losses of the wind park may be reduced.

In an embodiment, the power cable comprises a plurality of sections and the method further comprises localizing that section of the power cable that requires the reduction of the stress.

In a further embodiment, reducing the electrical power transported on the power cable comprises controlling a power flow of electrical power in the wind park such that at least a portion of the electrical power that is transported on the power cable bypasses the power cable.

When the one or more wind turbines are interconnected in an arrangement, that allows guiding the generated electrical power along a plurality of power flow paths, the stressed power cable may be bypassed. Hence, the wind turbines may continue their operation (up to full power) and still a failure of the power cable is avoided. Such guiding of the power flow may for example be achieved by an arrangement of the wind turbines according to a ring structure or according to a parallel structure and switches being controllable to activate/deactivate sections and hence to activate/deactivate power flow paths in the structure.

According to an embodiment, the power cable comprises at least one fiber optic cable and the monitoring of the one or more stress parameters comprises applying an optical measuring method utilizing the at least one fiber optic cable.

In an embodiment, the optical measuring method may be based on distributed temperature sensing and/or optical time-domain reflectometer.

In an embodiment, monitoring the stress parameters comprises monitoring at least a parameter correlating with the stress acting on the power cable and/or an expected failure of the power cable, and the step of determining whether a reduction of the stress is required is additionally or alternatively based on the at least one correlating parameter.

In an embodiment, monitoring the stress parameters comprises monitoring at least a model input parameter, and the method further comprises deriving based on the at least one model input parameter and a model at least a model output parameter, and wherein the at least one model output parameter correlates with and/or approximates and/or estimates at least one of the stress acting on the power cable and an expected failure of the power cable, and the determining whether a reduction of the stress is required is additionally or alternatively based on the at least one model output parameter. The model may modelled in software in accordance with the known in the art techniques of system theory and/or artificial intelligence. The model output may comprise predictive information and/or actual information. The model may for example be a simulation representing the influence of the stress on the power cable or a prediction when a total failure of the power cable is expected.

According to an embodiment, the method comprises obtaining a prediction of an environmental parameter and/or an operating parameter having an influence on the stress on the power cable and basing the determining whether the reduction of the stress is required on the prediction.

The step of determining whether a reduction of the stress is required may be based additionally or alternatively on the prediction.

Obtaining the prediction may for example comprise monitoring the prediction and/or deriving the prediction from another parameter. Obtaining may also comprise receiving the required information, for example from a data source, e.g., a server or any kind of data carrier or the like. The data source may be external or comprised in the wind park. As an example, a fatigue of the power cable may be predicted based on a monitored motion of the power cable. Such prediction may be derived from information comprising meteorological data, e.g., weather data from a weather forecast, and/or information comprising water condition data, e.g., streams in the water. Such information may be received from an external server and/or monitored by one or more respective monitoring units, e.g., sensors, comprised in the wind park.

According to an embodiment, the prediction comprises a prediction of the electrical power that is transported on the power cable and/or the prediction comprises a prediction having an influence on the stress on the power cable.

According to an embodiment, obtaining the prediction of the electrical power that is transported on the power cable comprises obtaining meteorological data, and deriving, from the meteorological data, a prediction of the power generated by one or more wind turbines the power generated by which is transported on the power cable. Alternatively or additionally, obtaining the prediction having an influence on the stress on the power cable comprises obtaining water condition data and deriving, from the water condition data, a prediction of the power that the power cable is able to transport without failure or a risk of failure. It may alternatively or additionally be derived, from the water condition data, a prediction of the power that the power cable is able to transport without leaving a predetermined range, e.g., a temperature range.

The meteorological data may for example comprise parameters indicative of a wind speed, a wind direction, an air temperature, a humidity, a visibility, an air pressure and a cloud base. The meteorological data may additionally or alternatively comprise a weather forecast. The meteorological data may at least partially be monitored in the wind park, e.g., by sensoring by respective monitoring units. The meteorological data may further at least partially be received from an external data source as outlined above.

Utilizing meteorological data, weather data, water condition data and predictions thereof allows that determining whether a reduction of the electrical power transported on the power cable is required and in response thereon to reduce the stress acting on the power cable. For example, a prediction that strong winds are not expected to continue may allow determining that it is not required to reduce the electrical power. When the strength of the wind is expected to decrease by natural less power may be expected to be generated by the respective wind turbines and, thus, it may accordingly be expected that less power is transported on the power cable. During the period of less transported power on the power cable, the power cable cools down and the thermal stress thereon is reduced without curtailing any wind turbines. Similarly, and as another example, a low water temperature may indicate or predict a natural cooling of the power cable and it may be determined considering the temperature that a reduction of the power generated by the wind turbines is not required. In other words, the electrical power transported on the power cable/the stress acting on the power cable may be (only) reduced when it is expected that without the reducing the power cable fails or will fail or fails/will fail with a determined probability.

Such prediction may further increase the overall power production of the wind park and in parallel reduce the cable failures in the wind park.

According to an embodiment, determining whether the reduction of the stress on the power cable is required comprises obtaining a threshold associated with the monitored stress parameter and determining whether the monitored stress parameter exceeds the predetermined threshold.

Such thresholds may be derived from empirical or historical data.

Such determining may thus not require a great computational effort and may still be precise.

According to an embodiment, the one or more stress parameters are monitored at a plurality of positions being distributed along the power cable and each of the positions is associated with a location information. In embodiments, the method further comprises localizing, based on the location information, a location of that section of the power cable that requires the reduction of the stress. In an embodiment, the distance between a first position and a second position of the plurality of positions may be 15 meters, 10 meters, 1 to 3 meters or even below 1 meter. Still, longer distances, e.g., above 15 meters, are also possible.

In embodiments, the method may further comprise providing the location. The location may be GPS-data or the like. Such data may be exemplarily provided for guiding a maintenance operation unit to the location at which the failure may occur or at which the power cable is damaged, i.e., to the location at which maintenance is required.

According to an embodiment, the method further comprises detecting based on the monitored stress parameter a fatigue of the power cable and notifying about the fatigue before a failure of the power cable. In an embodiment, the fatigue may be due to the thermal stress and/or mechanical stress acting on the power cable and is indicative of an expected failure of the power cable.

According to an embodiment, the method further comprises detecting based on the monitored stress parameter that the power cable is detached from an attachment of the power cable and notifying that the power cable is detached.

The notifying may comprise a warning that the power cable is detached and/or fatigues.

In response to such warning a maintenance unit may be sent out to react onto the detachment of the power cable. It may in particular be provided with information where the power cable is detached, e.g., by GPS information, the information being obtained by the monitoring step.

According to an embodiment of the invention, a control system for controlling electrical power transported on one or more power cables of a wind park is provided. Each of the one or more power cables is configured to transport electrical power generated by one or more wind turbines comprised in the wind park. The control system is configured to perform any of the herein described methods.

The control system may for example include a processing unit and a memory, the memory storing control instructions which when executed by the processing unit of the control system, cause the control system to perform any of the methods described herein. The processing unit may for example include a digital signal processor, an application specific integrated circuit, a field programmable gate array, a microprocessor or the like. The memory may include RAM, ROM, Flash Memory, a hard disk drive and the like.

The control system may be a master or central control system.

The control system may comprise a plurality of control systems and a master control system, wherein each of the plurality of control systems may be communicatively coupled with or comprised in one of the one or more wind turbines and further communicatively coupled with the master control system. Each of the plurality of control systems and the master control system may comprise a processing unit and a memory unit. The control system may be configured to perform any of the methods described herein, wherein steps of the method may be performed distributed over the plurality of control systems and the master control system.

The master control system may for example be a control system on wind park level, e.g., a wind park server. The master control system may communicate directly or indirectly with a control system communicatively coupled with or comprised in a wind turbine.

According to an embodiment of the invention, a monitoring unit configured to monitor one or more stress parameters on a power cable, the parameters being indicative of stress acting on the power cable is provided. The power cable is comprised by one or more power cables of a wind park. Each of the one or more power cables is configured to transport electrical power generated by one or more wind turbines comprised in the wind park.

In an embodiment, the power cable may be an inter-array cable, export cable or infield cable.

In an embodiment, the power cable may comprise at least one fiber optic cable and the monitoring unit may be configured to apply an optical measuring method utilizing the at least one fiber optic cable.

Further, other features related to any of the herein described different aspects and embodiments of the invention may correspondingly be comprised by the monitoring unit configured to monitor one or more stress parameters on a power cable.

According to an embodiment of the invention, a wind park is provided. The wind park comprises one or more wind turbines being coupled to one or more power cables and the one or more power cables. Each of the one or more power cables is configured to transport electrical power generated by the one or more wind turbines. The wind park further comprises any of the herein described monitoring units.

According to an embodiment of the invention, a wind park is provided. The wind park comprises one or more wind turbines being coupled to one or more power cables and the one or more power cables. Each of the one or more power cables is configured to transport electrical power generated by the one or more wind turbines. The wind park further comprises any of the herein described control systems, wherein the control system is configured to control electrical power transported on the one or more power cables.

According to an embodiment of the invention, a computer program product (non-transitory computer readable storage medium having instructions, which when executed by a processor, perform actions) for controlling electrical power transported on one or more power cables of a wind park is provided. The wind park comprises a control system configured to control electrical power transported on the one or more power cables of a wind park. The computer program comprises control instructions which, when executed by a processing unit of the control system, cause the control system to perform any of the herein described methods. The computer program may be provided on a volatile or non-volatile storage medium or data carrier.

According to an embodiment of the invention a computer program for controlling electrical power transported on one or more power cables of a wind park is provided, wherein the computer program comprises control instructions which, when executed by a processing unit, cause the processing unit to perform any of the methods described herein. The computer program may be provided on a volatile or non-volatile storage medium or data carrier.

According to an embodiment of the invention, a method of controlling a transport parameter of a medium transported in one or more pipelines of a wind park is provided. Each of the one or more pipelines is configured to transport the medium generated from electrical power generated by one or more wind turbines comprised in the wind park. In embodiments, the method comprises for at least one pipeline of the one or more pipelines: monitoring one or more stress parameters indicative of stress acting on the pipeline to generate a monitored stress parameter, determining, based on at least the monitored stress parameter, whether a reduction of the stress on the pipeline is required, and, when the reduction is required, manipulating the transport parameter of the medium to reduce the stress acting on the pipeline.

According to an embodiment of the invention, a monitoring unit configured to monitor one or more stress parameters on a pipeline indicative of stress acting on the pipeline is provided. The pipeline is comprised by one or more pipelines of a wind park. Each of the one or more pipelines is configured to transport a medium generated from electrical power generated by one or more wind turbines comprised in the wind park.

According to both the method of controlling a transport parameter of a medium and the monitoring unit configured to monitor one or more stress parameters on a pipeline, the medium may for example be hydrogen in embodiments. Further, in embodiments, at least one fiber optic cable may be comprised in the pipeline and the monitoring unit may be configured to apply an optical measuring method utilizing the at least one fiber optic cable. Furthermore, other features related to any of the herein described different aspects and embodiments of the invention may correspondingly be comprised by both the method of controlling a transport parameter of a medium and the monitoring unit configured to monitor one or more stress parameters on a pipeline. It should be clear, that also such features may be comprised that relate to herein described embodiments and aspects that relate to the protection of power cables. Such features may be adapted, when required, so as to be transferable on the protection of pipelines.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with references to the following Figures, wherein like designations denote like members, wherein:

FIG. 3 is a schematic flow diagram illustrating a method of controlling electrical power transported on one or more power cables of a wind park according to an embodiment.

DETAILED DESCRIPTION

Figure 1:
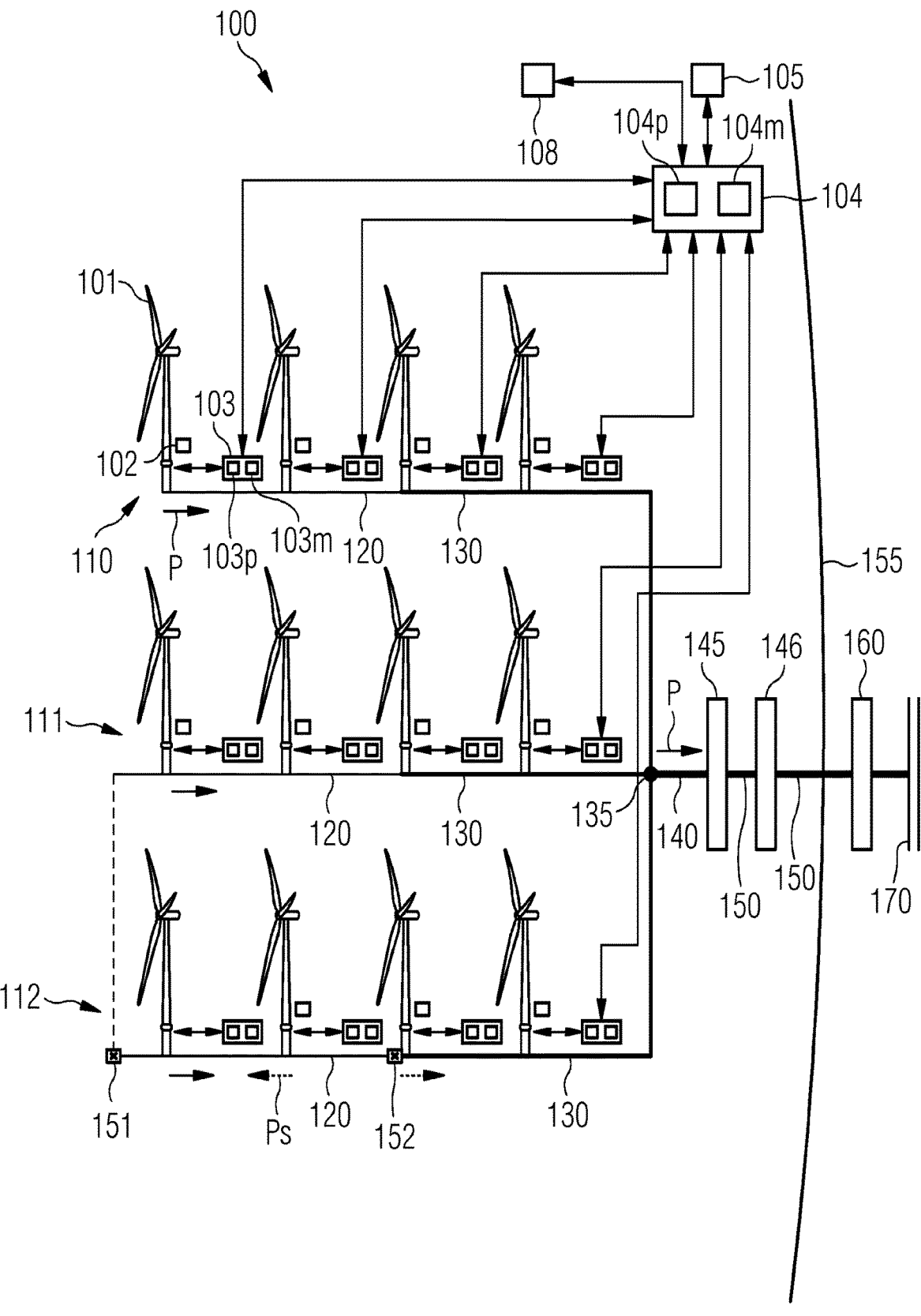
FIG. 1 is a schematic drawing illustrating a wind park configured to perform a method of controlling electrical power transported on one or more power cables of the wind park according to an embodiment.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

It should be clear that descriptions and explanations herein which are limited to specific wind turbines may be applied to other/all wind turbines of a wind park comprising the specific wind turbines, even if such other/all wind turbines are not shown in the respective figure.

It is noted that a power cable may herein also be referred to as only 'cable'.

It is noted that a wind turbine may herein also be referred to as only 'turbine'.

FIG. 1 is a schematic drawing illustrating a wind park 100 configured to perform a method of controlling electrical power transported on one or more power cables 120, 130, 140 of the wind park 100 according to an embodiment. The wind park 100 shown in FIG. 1 is an offshore wind park comprising a plurality of wind turbines 101. It should be clear that the number of wind turbines 101 is not limited to the number shown in FIG. 1. A coastline 155 marks exemplarily a transition between the offshore and the onshore region. The wind turbines 101 are coupled in series of four wind turbines in a first array 110, a second array 111 and a third array 112. It should be clear that the structure of how the wind turbines are arranged and coupled is not limited to the example as shown in FIG. 1 and that embodiments of the invention may be applied on other structures according to which the wind turbines are arranged. For each of the arrays 110, 111, 112, the first and second wind turbines of the respective array are coupled to a power cable 120 having a first diameter and the third and fourth wind turbines of the same array are coupled to a power cable 130 having a second diameter. The second diameter is in the shown example greater than the first diameter. A power flow direction P indicates the direction of the flow of power generated by the wind turbines and is represented by a solid line arrow. The arrays are coupled at coupling point 135 and the power flow is provided therefrom to offshore substation 145 by power cable 140 having a third diameter. The third diameter is in the shown example greater than the diameter of the power cable 130. The power cables 120, 130, 140 may be inter-array cables. The power is provided from the offshore substation 145 via offshore converter station 146 to an onshore substation 160 by power cable 150. The power cable 150 may be an export cable. The power is fed into grid 170 from the onshore substation 160.

The wind park 100 is controlled by wind park controller 104 comprising a processing unit 104p and a memory unit 104m. The wind park controller 104 may be communicatively coupled with a central monitoring unit 108 and a data source 105. The data source 105 may be an interface to request and/or receive external data, e.g., from an external network. A weather forecast from a weather server may be a non-limiting example. Both the central monitoring unit 108 and the data source 105 may also be accessed directly or via the wind park controller 105 by each of the wind turbines 101. Further, wind park controller 104 may be communicatively coupled to each wind turbine controller 103 of the respective wind turbine 101 of the wind park 100. Each wind park controller 103 may comprise a processing unit 103p and a memory unit 103m. The wind park controller 103 may control the operation of the respective wind turbine 101. The wind turbine controller 103 may be instructed how to control the respective wind turbine 101 from wind park controller 104 or determine such operation itself. Hence, a control system for controlling the electrical power transported on the power cables of the wind park 100 may be composed from at least one of the wind turbine controllers 103 and the wind park controller 104. Each wind turbine 101 may further be associated with a wind turbine monitoring unit 102, the unit 102 monitoring to generate data related to the respective wind turbine. The wind turbine monitoring unit 102 may further be communicatively coupled or part of or embedded in the respective wind turbine controller 103. The data related to the respective wind turbine may for example comprise data related to the power cable to which the respective wind turbine 101 is coupled. In embodiments, such data may be related to data about mechanical and/or thermal stresses on the power cable. The wind turbine monitoring unit may for example monitor at least one of a temperature of the respective power cable, a bending radius (in any direction) along the respective power cable, or a motion of the respective power cable. Based on the monitored data it may be determined whether a failure of the power cable is expectable. For example, based on the bending and/or motion data it may be determined that the power cable is detached from its fixture as originally applied and is, hence, exposed to a higher risk of failure due to fatigue as a result of for example seabed movements or erosion. Also, a high temperature may indicate a failure due to an overheating of the power cable. The determining may additionally be based on further influencing factors. Such further influencing factors may also be monitored by the wind turbine monitoring unit 103 and/or a portion of all wind turbine monitoring units or all wind turbine monitoring units comprised in the wind park 100, and/or the central monitoring unit 108. It may also be possible that such further influencing factors may be predicted, for example based on monitored data that may be fed into a computable predictive model in embodiments. It may also be possible that such further influencing factor comprises a prediction, e.g., a weather forecast or a water condition forecast. Such prediction may be communicatively received at the wind park controller 104 and/or the wind turbine controller 103.

As mentioned, based on the collected data it may be determined whether the stress on the power cable has to be reduced to avoid a failure of the power cable. The determining may be performed decentral by each of the wind turbine controllers 103 or central by the wind park controller 104. In response to determining that a reduction of the stress is required one or more wind turbines comprised in the wind park may be controlled so as to reduce the electrical power transported on the power cable.

This may be achieved by curtailing the power output by the wind turbines that feed power into the failure-prone power cable such that the power that is transported on the failure-prone power cable is reduced.

A wind turbine 101 arranged in the structure as shown in FIG. 1 may in the following be referred to as 'wind turbine #a, i', wherein 'a' and 'i' indicates the position of the wind turbine in the structure, the a representing the a-th array as indicated above, and the i representing the i-th wind turbine starting from the left-hand side of FIG. 1. For example, wind turbine #2,3 is the third wind turbine in the second array and wind turbine #3,4 is in the third array the last wind turbine before the coupling point 135.

Considering the wind park 100 as shown in FIG. 1, it is exemplarily assumed that it is determined that the power cable between wind turbine #3,2 and #3,3 requires that the power flow on that section is reduced, e.g., due to an expected overheating of the section. In response, wind turbine #3,2 may be curtailed, e.g., down to 75%, 50% or even 25% of its power rating, and, thus, less power flows on the section. It should be clear that the strength of curtailing may be determined dynamically depending on the actual situation, e.g., depending on how critical the condition of the failure-prone power cable is. In response to the curtailing, failure potential hotspots of the power cable may cool down or at least maintain its temperature without stopping power generation of single wind turbines of the wind park. The total electrical power generation of the wind farm can therefore continue to remain on an only slightly reduced level.

In a further embodiment, the reduced power flow on the failure-prone power cable may additionally or alternatively be achieved by rerouting the power flow.

Considering the wind park 100 as shown in FIG. 1, it is again exemplarily assumed that it is determined that the power cable between wind turbine #3,2 and #3,3 requires that the power flow on that section is reduced. In response to the determining, the second array 111 and the third array 112 are electrically connected (dashed line) by switching switch 151 (activating) and, in parallel, the wind turbine #3,1 and #3,2 may be electrically disconnected from wind turbine #3,3 and #3,4 by switching the switch 152 (deactivating). In response to controlling the wind park 100 in such a way, the power flow P is redirected as indicated by switched power flow Ps (dashed line arrows). As a result, no power is transported on the failure-prone power cable between wind turbine #3,3 and #3,4 and the wind turbines do not have to be curtailed. It is however noted that rerouting the power flow may increase the stress on other power cables and, hence, it has to be ensured that the other power cables are able to transport the additional power flow temporarily, e.g., over a short or longer period.

It should be clear that the remaining wind turbines of the wind park, i.e., that wind turbines that do not contribute to the reduction of the stress on the power cable may continue their operation unchanged. Further, it may be ensured that the curtailed (power reduced) wind turbines may return to full operation as soon as possible. For example, the reducing of the power output of the curtailed wind turbines may be reversed when it is determined that the stress on the power cable is reduced, or in response to other conditions or after expiration of a predefined period of time. Doing so, it may be ensured that the stress and, accordingly, the power output of the wind park is reduced only for the required period of time.

As indicated above, an array may have several sections, each of which has a different diameter. Considering for example array 112, the inter-array cable 120 has a diameter being smaller than that of inter-array cable 130. A plurality of wind turbines is however connected to a cable having one diameter and the risk of failure of a specific section of the cable (e.g., due to the creation of thermal hotspots) when following such cable from the starting point to the endpoint increases with each connected wind turbine. Thus, according to an embodiment, such sections of a power cable into which more wind turbines feed the electrical power they output may be monitored with a higher frequency.

Figure 2:
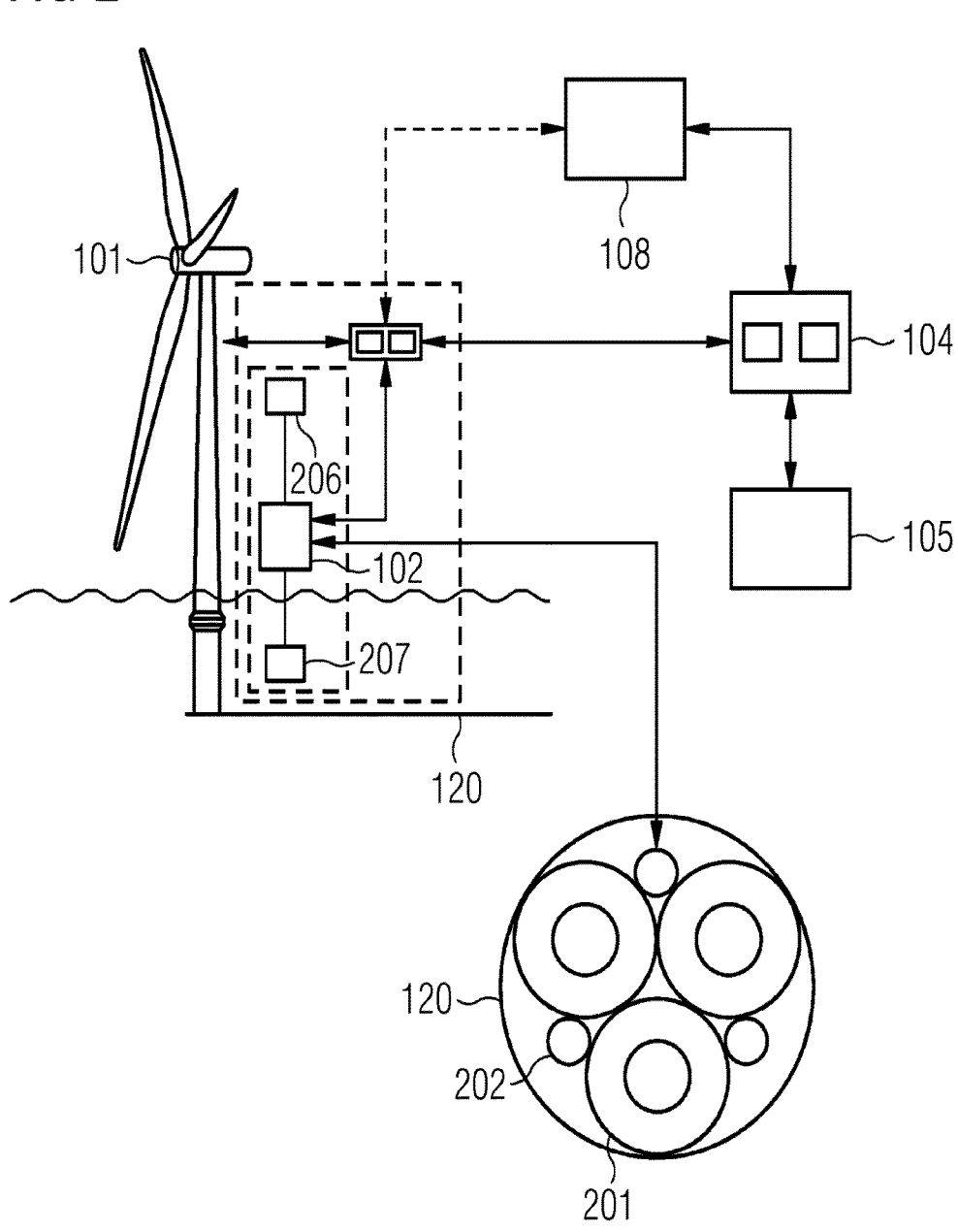
FIG. 2 is a schematic drawing illustrating a wind turbine of the wind park according to an embodiment.

FIG. 2 is a schematic drawing illustrating a wind turbine of the wind park 100 according to an embodiment. An inter-array cable 120 is electrically coupled to the wind turbine 101 and the wind turbine 101 feeds its generated power into the inter-array cable 120. Additional wind turbines that are not shown in FIG. 2 but are also comprised in the wind park 100 may also be electrically coupled to the inter-array cable 120. The wind turbine 101 comprises a monitoring unit 102, the monitoring unit being communicatively coupled with wind turbine controller 103. The wind turbine controller 103 is configured to control wind turbine 101. Considering the cross-sectional area of inter-array cable 120, the inter-array cable 120 comprises three power conductor cables to transport the power generated by the wind turbines coupled to inter-array cable 120. The inter-array cable further comprises three fiber optic cables 202 by which monitoring unit 102 monitors one or more stress parameters acting on the inter-array cable 120. In order to monitor the one or more stress parameters an optical measuring method may be applied that utilizes the fiber optic cables 202. Such method may for example be based on distributed temperature sensing and/or optical time-domain reflectometer. Parameters that are monitored by the optical measuring may for example be a temperature of the cable, a bending radius of the cable or a motion of the cable. Further parameters that are indicative of the stress acting on the inter-array cable 120 may be monitored by sensor unit 207 which may be configured to monitor water condition data, e.g., a stream in the water or a temperature of the water, and sensor unit 206 which may be configured to monitor meteorological data, e.g., a wind strength and a wind direction. Based on such monitored data, an influence on the stress acting on the inter-array cable may be derived. The influence of the parameters on the stress may be derived predictively, for example by a software model representing the influence on the stress. The required data may be obtained as outlined, e.g., by monitoring, decentrally, i.e., by a plurality of monitoring units as shown in FIG. 2, each being associated with one of the wind turbines that feed their power output into inter-array cable 120. The data may alternatively or additionally be obtained centrally on a higher hierarchy level, e.g., by wind park controller 104. According to the shown embodiment, the wind park controller 104 is communicatively coupled to the data source 105 and the central monitoring unit 108. The data source 108 provides access to external data, e.g., such data that may not be derived from data monitored by any of the monitoring units comprised in the wind park. Accordingly, the data source 108 may for example provide access to data comprising a weather forecast, e.g., from a weather server, or data comprising an upcoming grid power demand. The central monitoring unit 105 may further monitor such data that relates to the entire wind park. The data source 108 may also be communicatively coupled to the wind turbine 101 in order to allow the wind turbine 101 accessing the external data. Based on the obtained data that is indicative for the stress acting on the inter-array cable 120, the wind park controller 104 and/or the wind turbine controller 103 determines whether a reduction of the stress is required. It is hence determined whether a failure of the cable is expected due to overheating and/or cable destructive mechanical influences. When the reduction is required, the wind turbine controller 103 controls the wind turbine 101 such that its electrical power output is reduced and, thus, that the cable can maintain or reduce the stress acting on the cable, e.g., that the cable can maintain or reduce the actual temperature. It is noted that the wind turbine 101 may be instructed to reduce its power output by wind park controller 104 and that the wind park controller 104 may operate as a coordinating unit which instructs a plurality of wind turbines that feed their power output into inter-array cable 120. The wind park controller 108 may in such case instruct the plurality of wind turbines such that the respective wind turbine controllers curtail the power output by the respective wind turbine such that the overall wind park power output is minimally reduced while a failure of the inter-array cable 120 is avoided. The wind turbine controller 104 (and the remaining wind turbine controllers of the wind park 100) may alone or in combination with wind park controller 104 be configured to perform a method of controlling electrical power transported on one or more power cables of the wind park 100. Such method according to an embodiment is described in FIG. 3.

FIG. 3 is a schematic flow diagram illustrating a method (300) of controlling electrical power transported on one or more power cables of a wind park according to an embodiment. Each of the one or more power cables is configured to transport electrical power generated by one or more wind turbines comprised in the wind park. In embodiments, the method comprises for at least one power cable of the one or more power cables the following steps.

According to a step S301, one or more stress parameters on the power cable indicative of stress acting on the power cable are monitored to generate a monitored stress parameter.

According to a step S302, it is determined based on at least the monitored stress parameter, whether a reduction of the stress on the power cable is required.

According to a step S303, the electrical power transported on the power cable is reduced in order to reduce the stress acting on the power cable when the reduction is required.

Reducing the electrical power transported on the power cable (step S303) comprises, according to a step S304, controlling one or more wind turbines the power generated by which is transported on the power cable so as to reduce their power output, wherein for example, their power output is reduced so as to maintain or reduce a temperature in the power cable in embodiments.

The sequence of the method steps in FIG. 3 is not limited to the shown sequence. The method is further not limited to the shown number of steps. Certain steps of the method may not be carried out, may be replaced or extended.

Although the present invention has been disclosed in the form of embodiments and variations thereon, it will be understood that numerous additional modifications and variations could be made thereto without departing from the scope of the invention.

For sake of clarity, it is to be understood that the use of "a" or "an" throughout this application does not exclude a plurality, and "comprising" does not exclude other steps or elements.

The invention claimed is:

1. A method of controlling electrical power transported on one or more power cables of a wind park, wherein each of the one or more power cables is configured to transport electrical power generated by one or more wind turbines comprised in the wind park, and wherein the method comprises for at least one power cable of the one or more power cables:

monitoring one or more stress parameters indicative of stress acting on the power cable to generate a monitored stress parameter, determining, based on at least the monitored stress parameter, whether a failure of the power cable is expected and whether a reduction of the stress on the power cable is required to avoid the expected failure of the power cable, and, when the reduction is required, reducing the electrical power transported on the power cable to reduce the stress acting on the power cable.

2. The method of claim 1, wherein the power cable is an export cable, an inter-array cable or an infield cable.

3. The method of claim 1, wherein the one or more stress parameters comprise at least one parameter that is indicative of thermal stress on the power cable and/or at least one parameter that is indicative of mechanical stress on the power cable.

4. The method of claim 1, wherein the one or more stress parameters comprise a parameter being indicative of at least one of a bending radius of the power cable, a motion of the power cable and a temperature of the power cable.

5. The method of claim 1, wherein reducing the electrical power transported on the power cable comprises controlling one or more wind turbines by reducing their power output so the power generated by which is transported on the power cable is reduced.

6. The method of claim 5, wherein the controlling of the one or more wind turbines comprises curtailing an electrical power output of at least one wind turbine of the one or more wind turbines the power generated by which is transported on the power cable.

7. The method of claim 1, wherein the power cable comprises at least one fiber optic cable, and wherein the monitoring of the one or more stress parameters comprises applying an optical measuring method utilizing the at least one fiber optic cable.

8. The method of claim 1, wherein the method comprises obtaining a prediction of an environmental parameter and/or an operating parameter having an influence on the stress on the power cable, and basing the determining whether the reduction of the stress is required on the prediction.

9. The method of claim 8, wherein the prediction comprises a prediction of the electrical power that is transported on the power cable and/or, wherein the prediction comprises a prediction having an influence on the stress on the power cable.

10. The method of claim 9, wherein obtaining the prediction of the electrical power that is transported on the power cable comprises:

obtaining meteorological data, and deriving, from the meteorological data, a prediction of the power generated by one or more wind turbines the power generated by which is transported on the power cable, and/or wherein obtaining the prediction having an influence on the stress on the power cable comprises obtaining water condition data and deriving, from the water condition data, a prediction of the power that the power cable is able to transport without failure or a risk of failure.

11. The method according to claim 1, wherein determining whether the reduction of the stress on the power cable is required comprises;

obtaining a threshold associated with the monitored stress parameter, and determining whether the monitored stress parameter exceeds the predetermined threshold.

12. The method of claim 1, wherein the one or more stress parameters are monitored at a plurality of positions being distributed along the power cable, and wherein each of the positions is associated with a location information, wherein the method further comprises localizing, based on the location information, a location of that section of the power cable that requires the reduction of the stress.

13. The method of claim 1, wherein the method further comprises;

detecting based on the monitored stress parameter a fatigue of the power cable, and notifying about the fatigue before failure of the power cable.

14. The method of claim 1, wherein the method further comprises;

US 12,618,394 B2

17 detecting based on the monitored stress parameter that the power cable is detached from an attachment of the power cable, and notifying that the power cable is detached.

15. A control system for controlling electrical power transported on one or more power cables of a wind park, wherein each of the one or more power cables is configured to transport electrical power generated by one or more wind turbines comprised in the wind park, and wherein the control system is configured to perform the methods according to claim 1.

16. The method of claim 5, wherein their power output is reduced so as to maintain or reduce a temperature in the power cable.

\* \* \* \* \*